US012252928B1

(12) United States Patent
Franklin

(10) Patent No.: US 12,252,928 B1
(45) Date of Patent: Mar. 18, 2025

(54) TEMPORARY INSULATED COVER FOR WINDOWS

(71) Applicant: April Franklin, Lagrange, GA (US)

(72) Inventor: April Franklin, Lagrange, GA (US)

( * ) Notice: Subject to any disclaimer, the term of this patent is extended or adjusted under 35 U.S.C. 154(b) by 166 days.

(21) Appl. No.: 18/103,607

(22) Filed: Jan. 31, 2023

(51) Int. Cl.
*E06B 3/30* (2006.01)

(52) U.S. Cl.
CPC .................................... *E06B 3/307* (2013.01)

(58) Field of Classification Search
CPC . E06B 3/30; E06B 3/301; E06B 3/302; E06B 3/303; E06B 3/305; E06B 3/306; E06B 3/308; E06B 3/307; E06B 3/285; E06B 3/28; E06B 2009/005; E06B 2009/527; E06B 9/522; E06B 9/24; E06B 9/52
See application file for complete search history.

(56) References Cited

U.S. PATENT DOCUMENTS

| | | | | | |
|---|---|---|---|---|---|
| 2,804,139 | A * | 8/1957 | Pfau | E06B 3/28 | 160/397 |
| 2,814,078 | A * | 11/1957 | Durr | E06B 3/92 | 52/204.56 |
| 2,826,789 | A * | 3/1958 | Etling | E06B 9/54 | 160/91 |
| 2,834,071 | A * | 5/1958 | Camerino | E06B 3/2605 | 52/214 |
| 3,760,860 | A * | 9/1973 | Kelarakis | E06B 9/52 | 160/179 |
| 4,098,035 | A * | 7/1978 | Bessler | E06B 3/285 | 52/202 |
| 4,160,348 | A * | 7/1979 | Chapman | E06B 3/4609 | 160/354 |
| 4,210,191 | A * | 7/1980 | Li | E06B 3/285 | 160/354 |
| 4,372,082 | A * | 2/1983 | Pagel | E06B 3/28 | 49/505 |
| 4,445,563 | A * | 5/1984 | Meyeroff | E06B 3/28 | 160/369 |
| 4,676,024 | A * | 6/1987 | Rossman | E06B 3/28 | 49/414 |
| 5,368,085 | A * | 11/1994 | Ruparelia | E06B 3/285 | 160/354 |
| 5,720,137 | A * | 2/1998 | Rodriquez | E06B 9/522 | 160/98 |

(Continued)

FOREIGN PATENT DOCUMENTS

| | | |
|---|---|---|
| CA | 1280939 | 3/1991 |

*Primary Examiner* — Kyle J. Walraed-Sullivan

(57) ABSTRACT

The temporary insulated cover for windows is an insulating structure. The temporary insulated cover for windows includes a ring structure, a double pane treatment structure, and a window structure. The double pane treatment structure mounts in the ring structure. The ring structure removably mounts in the window structure. The ring structure and the double pane treatment structure encloses the window structure. The ring structure and the double pane treatment structure forms the insulating structure that enhances the insulation of the window structure. The ring structure is an adjustable structure. By adjustable structure is meant that the form factor of the ring structure is adjustable. This allows the temporary insulated cover for windows to be used in multiple window structures that have different form factors.

3 Claims, 5 Drawing Sheets

(56) References Cited

U.S. PATENT DOCUMENTS

| | | | | |
|---|---|---|---|---|
| 5,732,760 | A * | 3/1998 | Pattison | F24F 3/0442 160/381 |
| 5,918,430 | A * | 7/1999 | Rowland | E06B 3/28 52/202 |
| 6,052,957 | A * | 4/2000 | Minnich | E06B 3/28 52/204.64 |
| 6,877,286 | B2 | 4/2005 | Johnson | |
| D555,256 | S | 11/2007 | Mattal | |
| 7,819,167 | B2 * | 10/2010 | Morin | E06B 9/52 160/102 |
| 2002/0144483 | A1 * | 10/2002 | Shippen | E06B 3/28 52/204.593 |
| 2004/0035082 | A1 * | 2/2004 | Hudoba | E06B 9/02 52/656.9 |
| 2004/0112553 | A1 * | 6/2004 | Minnich | E06B 3/28 160/378 |
| 2004/0154242 | A1 * | 8/2004 | Hudoba | F16B 43/00 52/202 |
| 2007/0256373 | A1 | 11/2007 | Collard | |
| 2008/0155910 | A1 * | 7/2008 | Reuter | E06B 3/285 52/746.1 |
| 2009/0173451 | A1 * | 7/2009 | Walker | E06B 3/285 156/929 |
| 2010/0178449 | A1 | 7/2010 | Hu | |
| 2010/0300629 | A1 | 12/2010 | Virden | |
| 2011/0047875 | A1 * | 3/2011 | Kelley | E06B 3/28 49/63 |
| 2011/0078963 | A1 * | 4/2011 | Pardue | E06B 9/00 52/202 |
| 2013/0075046 | A1 | 3/2013 | Trousdale | |
| 2014/0144090 | A1 * | 5/2014 | Rebman | E06B 3/301 52/203 |
| 2014/0331578 | A1 * | 11/2014 | Wexler | E06B 3/28 52/741.1 |
| 2016/0069127 | A1 * | 3/2016 | Koenitz | E06B 9/02 160/368.1 |
| 2016/0273261 | A1 * | 9/2016 | Pardue | E06B 7/23 |
| 2016/0348418 | A1 * | 12/2016 | Wexler | E06B 9/24 |
| 2018/0258685 | A1 * | 9/2018 | Pardue | E06B 7/2314 |
| 2018/0347258 | A1 * | 12/2018 | Wexler | E06B 9/00 |
| 2019/0048649 | A1 * | 2/2019 | Koenitz | E06B 1/32 |
| 2019/0271187 | A1 * | 9/2019 | Wexler | E06B 3/285 |
| 2019/0368263 | A1 * | 12/2019 | Begin | E06B 3/58 |
| 2022/0042367 | A1 * | 2/2022 | Hartford | E06B 9/02 |
| 2022/0195785 | A1 | 6/2022 | Greene | |
| 2023/0374851 | A1 * | 11/2023 | Wexler | E06B 3/285 |

* cited by examiner

TEMPORARY INSULATED COVER FOR WINDOWS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of panels for windows. (E06B9/0638)

SUMMARY OF INVENTION

The temporary insulated cover for windows is an insulating structure. The temporary insulated cover for windows comprises a ring structure, a double pane treatment structure, and a window structure. The double pane treatment structure mounts in the ring structure. The ring structure removably mounts in the window structure. The ring structure and the double pane treatment structure encloses the window structure. The ring structure and the double pane treatment structure forms the insulating structure that enhances the insulation of the window structure. The ring structure is an adjustable structure. By adjustable structure is meant that the form factor of the ring structure is adjustable. This allows the temporary insulated cover for windows to be used in multiple window structures that have different form factors.

These together with additional objects, features and advantages of the temporary insulated cover for windows will be readily apparent to those of ordinary skill in the art upon reading the following detailed description of the presently preferred, but nonetheless illustrative, embodiments when taken in conjunction with the accompanying drawings.

In this respect, before explaining the current embodiments of the temporary insulated cover for windows in detail, it is to be understood that the temporary insulated cover for windows is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the temporary insulated cover for windows.

It is therefore important that the claims be regarded as including such equivalent construction insofar as they do not depart from the spirit and scope of the temporary insulated cover for windows. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the 9 art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
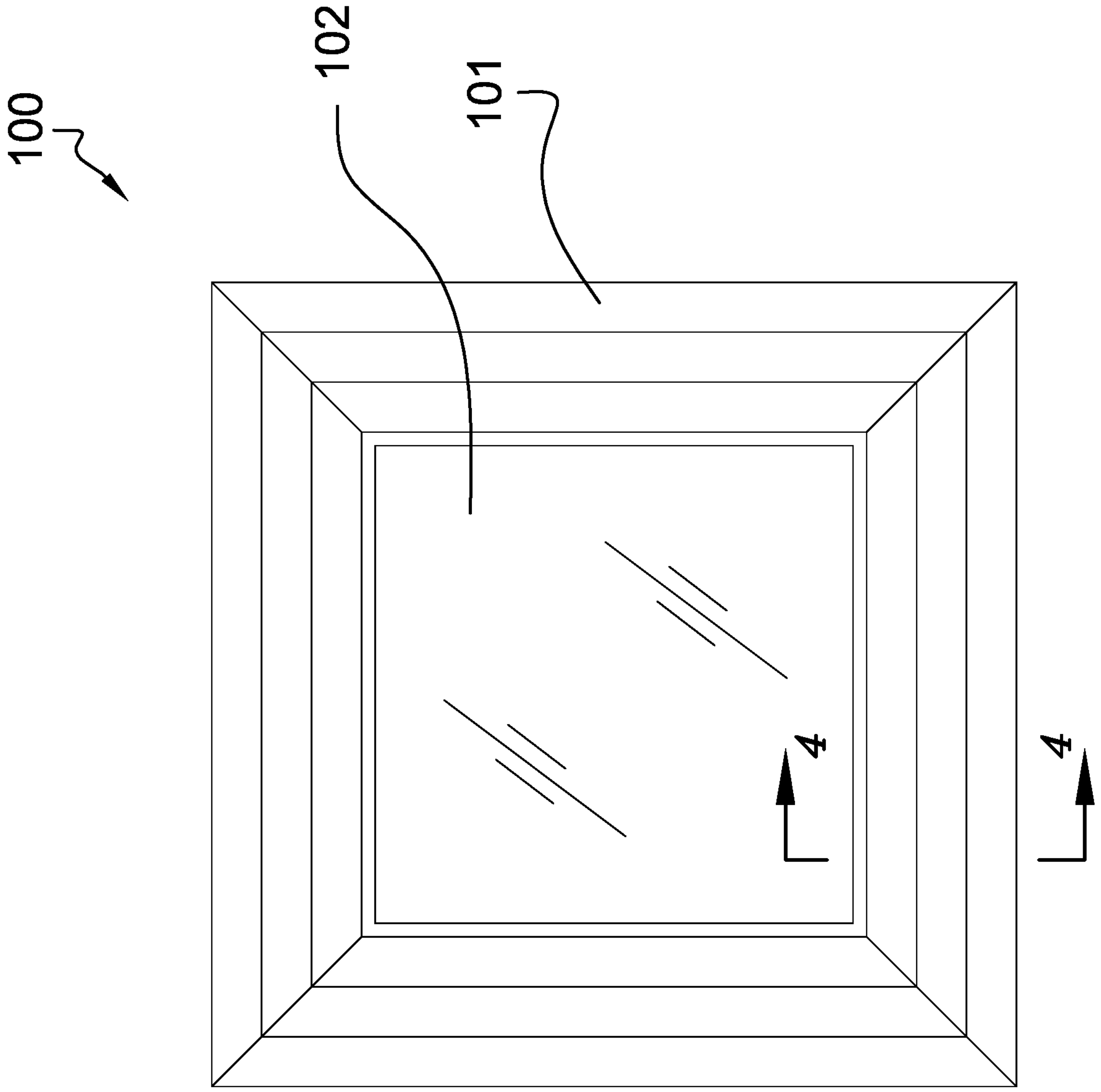
FIG. 1 is a front view of an embodiment of the disclosure.
Figure 3:
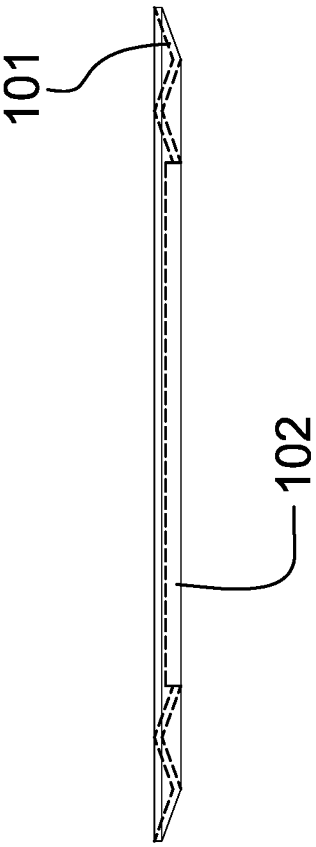
FIG. 3 is a top view of an embodiment of the disclosure.
Figure 2:
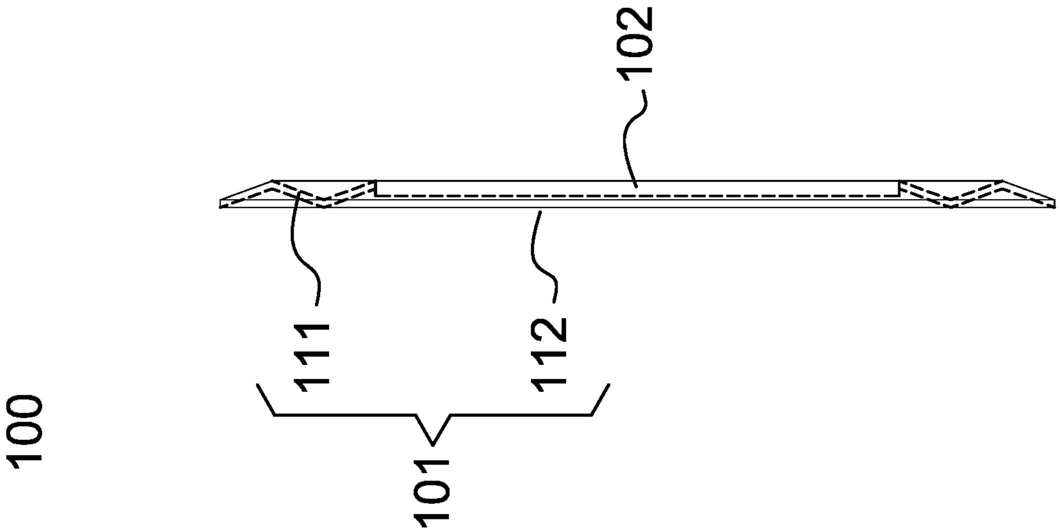
FIG. 2 is a side view of an embodiment of the disclosure.
Figure 4:
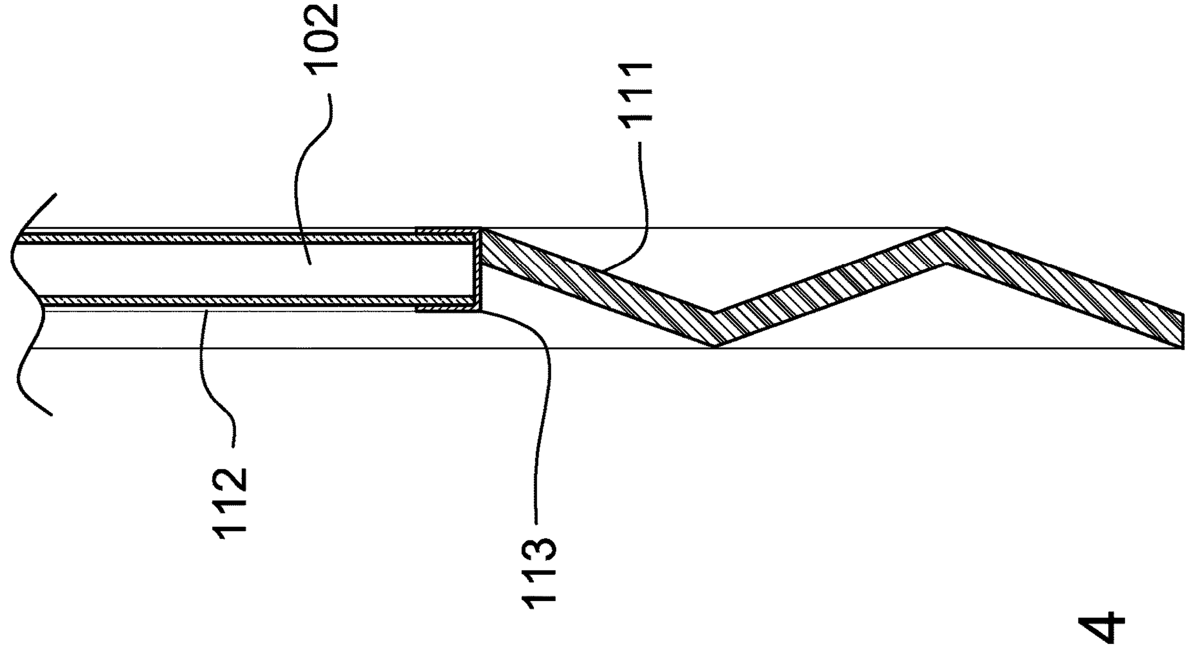
FIG. 4 is a detail view of an embodiment of the disclosure.
Figure 5:
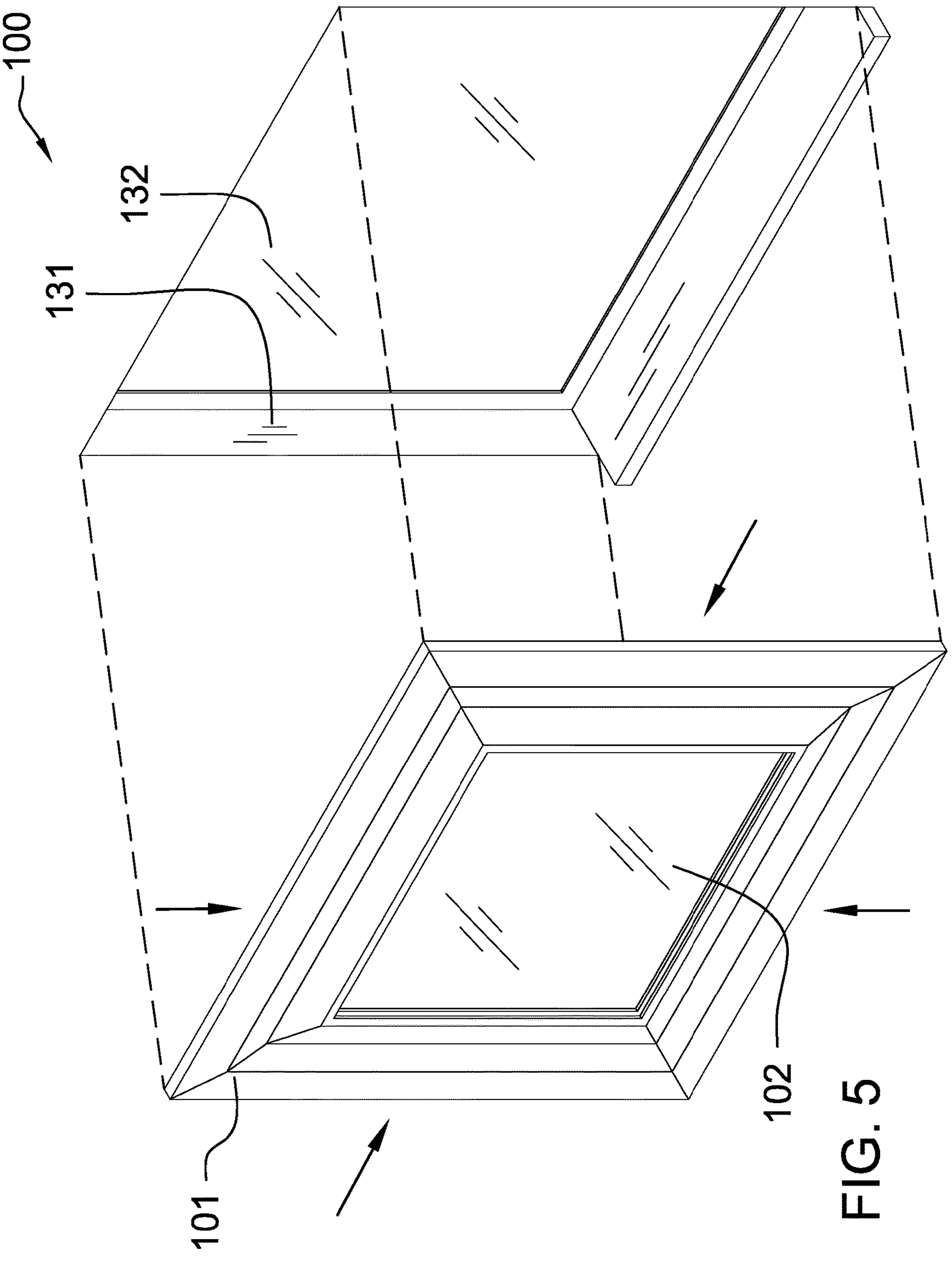
FIG. 5 is an in-use view of an embodiment of the disclosure.
Figure 6:
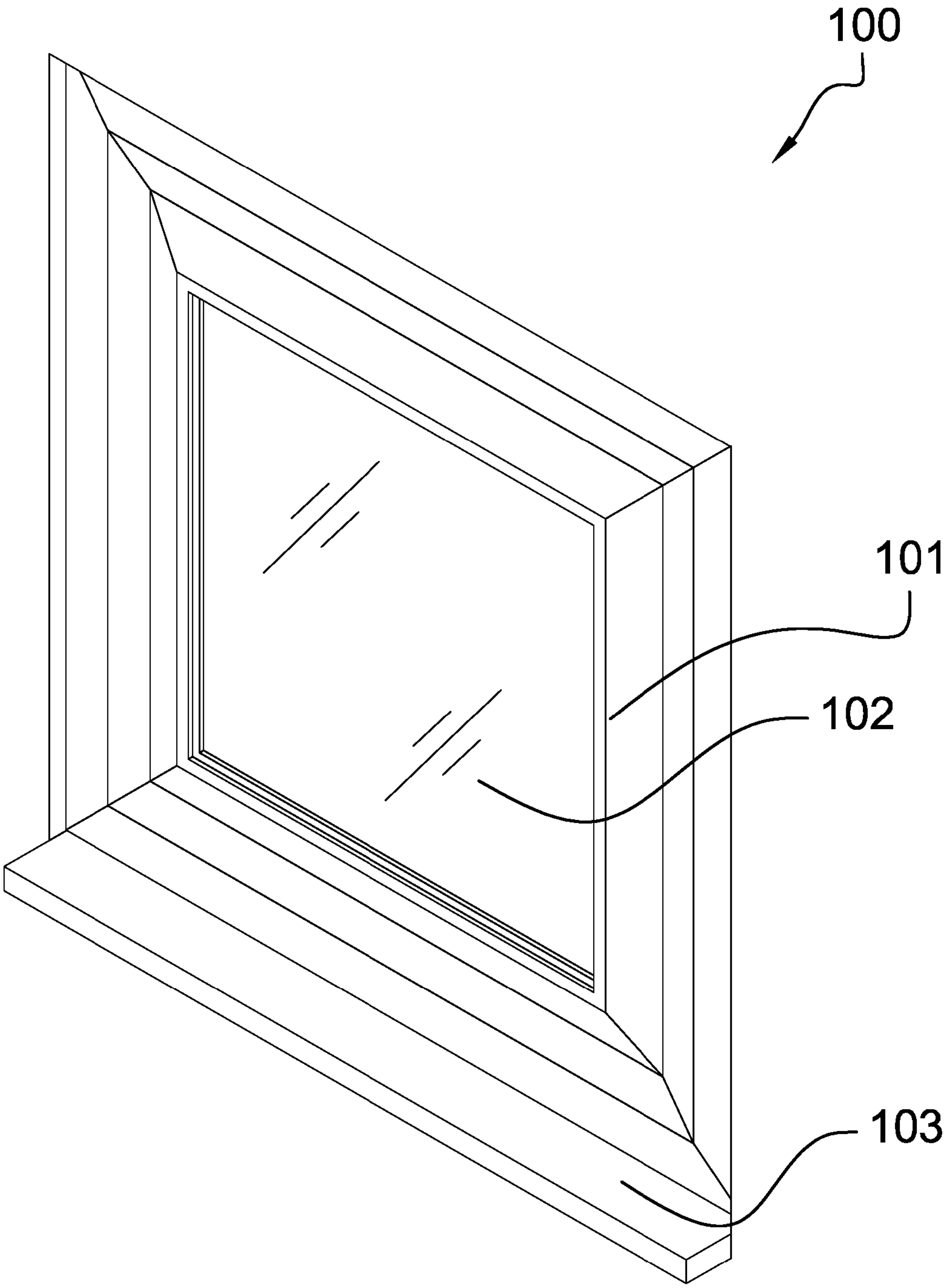
FIG. 6 is an in-use view of an embodiment of the disclosure.

Detailed reference will now be made to one or more potential embodiments of the disclosure, which are illustrated in FIGS. 1 through 6.

The temporary insulated cover for windows 100 (hereinafter invention) is an insulating structure. The invention 100 comprises a ring structure 101, a double pane treatment structure 102, and a window structure 103. The ring structure 101 may be referred to as a frame structure 101. The exact shape of the frame structure 101 is to not be limited to a ring, or any other shape. The double pane treatment structure 102 mounts in the ring structure 101. The ring structure 101 removably mounts in the window structure 103. The ring structure 101 and the double pane treatment structure 102 encloses the window structure 103. The ring structure 101 and the double pane treatment structure 102 forms the insulating structure that enhances the insulation of the window structure 103. The ring structure 101 is an adjustable structure. By adjustable structure is meant that the form factor of the ring structure 101 is adjustable. This allows the invention 100 to be used in multiple window structures 103 that have different form factors.

The window structure 103 forms a window. The window structure 103 is defined elsewhere in this disclosure. The window structure 103 is a transparent structure that allows light to enter and exit a building. The window structure 103 is built into the structure. The window structure 103 comprises a window frame 131 and a window transparent structure 132. The window frame 131 is defined elsewhere in this disclosure. The window transparent structure 132 is a disk shaped structure. The window transparent structure 132 is formed from a transparent material. The window transparent structure 132 is the component of the window structure 103 that allows light to pass through the window structure 103.

The double pane treatment structure 102 is a transparent structure. The double pane treatment structure 102 overlays the window transparent structure 132 of the window structure 103 such that a portion of the light that passes through the window transparent structure 132 will also pass through the double pane treatment structure 102. The double pane treatment structure 102 rests flush against the window transparent structure 132. The double pane treatment structure 102 is a disk shaped structure. The double pane treatment structure 102 mounts in the ring structure 101. The double pane treatment structure 102 fully encloses the characteristic aperture 112 of the ring structure 101.

The double pane treatment structure 102 is an insulating structure. The double pane treatment structure 102 inhibits the transfer of heat from the window transparent structure 132 to the interior space of the structure that contains the window frame 131. In the first potential embodiment of the disclosure, the double pane treatment structure 102 is a double pane of glass with a vacuum that is formed between the glass panes.

The ring structure 101 is a disk shaped structure. The ring structure 101 has a ring shape. The ring structure 101 is an adjustable structure. By adjustable is meant that the form factor of the perimeter of the ring structure 101 adjusts to the form factor of the window frame 131 of the window structure 103. The ring structure 101 inserts into the window frame 131 such that a congruent end of the overlays the ring structure 101 overlays the window transparent structure 132 of the window structure 103. The ring structure 101 is forms an insulating structure that improves insulation of the window structure 103. The ring structure 101 attaches to the window structure 103 using a removable adhesive. The ring structure 101 comprises a perimeter structure 111, a characteristic aperture 112, and a dpts mount 113.

The perimeter structure 111 forms the perimeter of the ring structure 101. The perimeter structure 111 is a disk shaped structure. The characteristic aperture 112 is formed through the center of the perimeter structure 111. The perimeter structure 111 is an adjustable structure. By adjustable is meant that the form factor of the perimeter of the perimeter structure 111 adjusts to the form factor of the window frame 131 of the window structure 103. The form factor of the perimeter structure 111 adjusts such that the invention 100 will rest flush against the window transparent structure 132 of the window structure 103. The perimeter structure 111 is formed with one or more accordion folds. The form factor of the perimeter structure 111 adjusts by adjusting each of the one or more accordion folds to adjust the reach between the characteristic aperture 112 and the outer perimeter of the perimeter structure 111.

The perimeter structure 111 is an insulating structure. The accordion fold of the perimeter structure 111 is formed from a polymer based material with low thermal conductivity.

The characteristic aperture 112 is the negative space that is formed through the disk structure of the perimeter structure 111. The characteristic aperture 112 is sized to receive the double pane treatment structure 102. The form factor of the characteristic aperture 112 is geometrically similar to the form factor of the double pane treatment structure 102 such that the double pane treatment structure 102 fully encloses the characteristic aperture 112.

The dpts mount 113 is a fastening structure. The dpts mount 113 installs on the perimeter structure 111 such that the dpts mount 113 encloses the perimeter of the characteristic aperture of the ring structure 101. The dpts mount 113 attaches the double pane treatment structure 102 to the perimeter structure such that the dpts mount 113 does not interfere with the adjustment of the form factor of the perimeter structure 111. The dpts mount 113 permanently attaches the double pane treatment structure 102 to the perimeter structure 111.

The following definitions were used in this disclosure:

Accordion Fold: As used in this disclosure, an accordion fold is a corrugated structure that resembles the bellows of an accordion.

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives. See removable adhesive, pressure sensitive adhesive, heat activated adhesive.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Flush: As used in this disclosure, the term flush is used to describe the alignment of a first surface and a second surface to form a single structure selected from the group consisting of a Euclidean plane and a non-Euclidean plane.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inner Perimeter and Outer Perimeter: As used in this disclosure, the inner perimeter and the outer perimeter refer to two geometrically similar structures of a curved object. The inner perimeter refers to the geometrically similar structure with the shorter span of length. The outer perimeter refers to the geometrically similar structure with the greater span of length.

Insulating Material: As used in this disclosure, an insulating material is a material that inhibits, and ideally prevents, the transfer of heat through the insulating material. Insulating materials may also be used to inhibit or prevent the transfer of sound or the conduction of electricity through the insulating material. Methods to form insulating materials include, but are not limited to: a) the use of materials with low thermal conductivity; b) the use of materials with low electrical conductivity (or high resistivity); and, c) the use of a structural design that places a vacuum within the insulating material within the anticipated transfer path of the heat, sound, or electric current flow.

Insulating Structure (Heat): As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Interior: As used in this disclosure, the interior is used as a relational term that implies that an object is contained within the boundary of a structure or a space.

Lateral Disk Structure: As used in this disclosure, a lateral plate structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Overlay: As used in this disclosure, an overlay refers to the placement of a second structure on or over a first structure such that the second structure covers or encloses the first structure.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Permanent: As used in this disclosure, the term permanent refers to a fundamental state, condition or location of an object, process, or arrangement that is not subject to, or expected to be, changed. A perpetual object refers to a permanent object that is expected to last over an unlimited period of time. A building such as a house or a skyscraper would be considered permanent. An ocean would be considered perpetual.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Removable Adhesive: As used in this disclosure, a removable adhesive is a commercially available adhesive that is designed with a lower tack, or stickiness, such that a first object is attached to a second object with a removable adhesive the first object can be readily removed in a manner that ideally, though not necessarily practically, leaves behind no adhesive residue on the second object. A repositionable adhesive is a subset of removable adhesives that are intended to allow the first object to be reattached to a third object or the second object in the initial or a different position. Within this disclosure, a removable adhesive is assumed to include repositionable adhesives. A removable adhesive is often called fugitive glue.

Reach: As used in this disclosure, reach refers to a span of distance between any two objects.

Ring: As used in this disclosure, a ring is a term that is used to describe a disk-like structure through which a negative space is formed through the faces of the disk-like structure. Rings are often considered loops. The negative space formed through the faces of the disk-like structure is called the characteristic aperture.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Temporary: As used in this disclosure, the term temporary refers to a state, condition or location of an object, process, or arrangement that is intended to last for a limited period of time. The term temporary is the opposite of permanent. The term transient refers to a temporary state or condition of an object that degrades over time. In physical processes, the term transient tends to imply a short period of time.

Vacuum: As used in this disclosure, vacuum is used to describe a first space that contains gas at a reduced gas pressure relative to the gas pressure of a second space. If the first space and the second space are connected together, this pressure differential will cause gas from the second space to move towards the first space until the pressure differential is eliminated.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Window: As used in this disclosure, a window is an opening in formed in a structure that is fitted with glass or other transparent material in a frame to that allows the passage of light through the structure.

Window Frame: As used in this disclosure, a window frame is a structure that mounts a window in a structure. The window frame forms the perimeter of the window in the structure. The window frame transfers the load of the window to the structure.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A temporary insulated cover for a window comprising a frame structure, a double pane treatment structure, and a window structure;

wherein the double pane treatment structure mounts in the frame structure;

wherein the frame structure removably mounts in the window structure;

wherein the temporary insulated cover for a window is an insulating structure;

wherein the frame structure comprises a perimeter structure, an aperture, and a double pain treatment structure mount (hereinafter dpts mount);

wherein the aperture is formed in the perimeter structure;

wherein the dpts mount secures the double pane treatment structure to the perimeter structure;

wherein the perimeter structure is formed with one or more accordion folds;

wherein a form factor of the perimeter structure adjusts by adjusting each of the one or more accordion folds to adjust a reach between a characteristic aperture and an outer perimeter of the perimeter structure;

wherein the frame structure and the double pane treatment structure encloses the window structure;

wherein the frame structure and the double pane treatment structure forms the insulating structure that provides an insulation of the window structure;

wherein the frame structure is an adjustable structure;

wherein a form factor of the frame structure is adjustable;

wherein the window structure is a transparent structure that allows light to enter and exit a building;

wherein the window structure is built into the building;

wherein the window structure comprises a window frame and a window transparent structure;

wherein the window transparent structure is formed from a transparent material;

wherein the window transparent structure is a component of the window structure that allows light to pass through the window structure;

wherein the double pane treatment structure is a transparent structure;

wherein the double pane treatment structure overlays the window transparent structure of the window structure such that a portion of the light that passes through the window transparent structure will also pass through the double pane treatment structure;

wherein the double pane treatment structure rests flush against the window transparent structure;

wherein the double pane treatment structure mounts in the frame structure;

wherein the double pane treatment structure fully encloses an aperture of the frame structure;

wherein the double pane treatment structure is an insulating structure;

wherein the double pane treatment structure is a double pane of glass with a vacuum that is formed between the glass panes;

wherein the frame structure is an adjustable structure;

wherein a form factor of a perimeter of the frame structure is adjustable to a form factor of the window frame of the window structure;

wherein the frame structure inserts into the window frame such that a congruent end of the frame structure overlays the window transparent structure of the window structure;

wherein the frame structure forms an insulating structure that insulates the window structure;

wherein the perimeter structure forms the perimeter of the frame structure;

wherein the aperture is formed through the center of the perimeter structure;

wherein the perimeter structure is an adjustable structure;

wherein a form factor of a perimeter of the perimeter structure is adjustable to the form factor of the window frame of the window structure;

wherein the form factor of the perimeter structure adjusts such that the temporary insulated cover for a window will rest flush against the window transparent structure of the window structure;

wherein the perimeter structure is an insulating structure;

wherein an accordion fold of the perimeter structure is formed from a polymer based material.

2. The temporary insulated cover for the window according to claim 1 wherein the aperture is a negative space that is formed through the perimeter structure;

wherein the aperture is sized to receive the double pane treatment structure;

wherein a form factor of the aperture correlates to a form factor of the double pane treatment structure such that the double pane treatment structure fully encloses the aperture.

3. The temporary insulated cover for the window according to claim 2 wherein the dpts mount is a fastening structure;

wherein the dpts mount installs on the perimeter structure such that the dpts mount encloses the perimeter of the aperture of the frame structure;

wherein the dpts mount attaches the double pane treatment structure to the perimeter structure such that the dpts mount does not interfere with an adjustment of the form factor of the perimeter structure;

wherein the dpts mount permanently attaches the double pane treatment structure to the perimeter structure.

* * * * *